United States Patent [19]

Boudjack

[11] Patent Number: 4,768,408
[45] Date of Patent: Sep. 6, 1988

[54] HANDTOOL FOR RELEASING BRAKE DRUM SHOE ADJUSTER MEMBER

[76] Inventor: Jacques Boudjack, 452 Frontenac Blvd., Black Lake, Canada, G0N 1A0

[21] Appl. No.: 95,690

[22] Filed: Sep. 14, 1987

[51] Int. Cl.⁴ .............................................. B23P 19/04
[52] U.S. Cl. ...................................... 81/485; 29/239; 29/267; 254/119
[58] Field of Search ..................... 81/485; 29/233, 239, 29/267; 254/15, 113, 119

[56] References Cited

U.S. PATENT DOCUMENTS 2,817,877  12/1957  Fannen .................................. 29/267

FOREIGN PATENT DOCUMENTS 163824  7/1915  Canada .
356837  3/1936  Canada .

*Primary Examiner*—Roscoe V. Parker

[57] ABSTRACT

A levered tool for spreading apart two interconnected semi-circular concentric brake drum shoes, to facilitate removal of the adjuster member which adjusts the minimum radius of the brake shoes. The semi-circular brake shoes are conventionally closed one toward the other at their inner ends as well as at their outer ends by coil springs, and are relatively pivotable about their inner ends. The adjuster member is usually an elongated spacer member, of adjustable length, extending in between the spaced inner ends of the brake shoes, against the bias of the corresponding coil springs. The outer circumferential faces of the brake shoes each comprises a transverse blade, the innermost edge of which projects inwardly relative to the main body of the brake shoes. The levered tool of the invention consists of a straight rigid bar and a rigid arm having a straight hand-gripping portion and an arcuate end portion, both the bar and the arm being pivotally interconnected about an intermediate portion of the former and about the arcuate portion of the latter. Notched ends of the tool bar and arm engage the blade innermost projecting edges. By forcibly pivoting the arm hand-gripping portion towards the notched end portion of the bar, the inner ends of the brake shoes will be spread apart, and the adjuster member will be released for cleaning and/or adjustment.

2 Claims, 1 Drawing Sheet

HANDTOOL FOR RELEASING BRAKE DRUM SHOE ADJUSTER MEMBER

FIELD OF THE INVENTION

This invention relates to a levered tool specifically designed to be used in relation with brake drum shoes.

BACKGROUND OF THE INVENTION

In conventional pairs of semi-circular concentric interconnected brake drum shoes, there is a spacer member in between two adjacent ends of the brake shoes. The length of the spacer member is automatically or manually adjustable by known means, whereby the minimum radius defined by the brake shoes is adjustable. Such adjustment is necessary because the distance between the outer circumferential wall of the brake shoes and the wheel drum is a critical value for optimum braking performance, which braking is normally effected by a hydraulic cylinder having outer plungers biasing the brake shoes outwardly against the wheel drum. Normal or abusive wear of the automotive parts do require once and awhile removal of the spacer member, when broken or for cleaning rust thereon, which prevents its operation.

Removal of the spacer member from between the adjacent inner ends of the brake shoes is a strenuous operation, because said adjacent inner spaced ends are biased one toward the other by heavy-duty coil springs, the bias of which is very powerful. Mechanics usually require a pair of screwdrivers and a pair of small pickbars for effecting removal of the said spacing member, i.e. that four tools are necessary.

OBJECTS OF THE INVENTION

The main object of the invention is to provide a single levered tool specifically designed to remove and replace the spacer member from a pair of interconnected brake drum shoes.

A corollary object of this invention is to increase the efficiency of the above-disclosed operation in a most cost-effective manner.

DETAILED DESCRIPTION OF THE EMBODIMENT OF THE INVENTION

Figure 2:
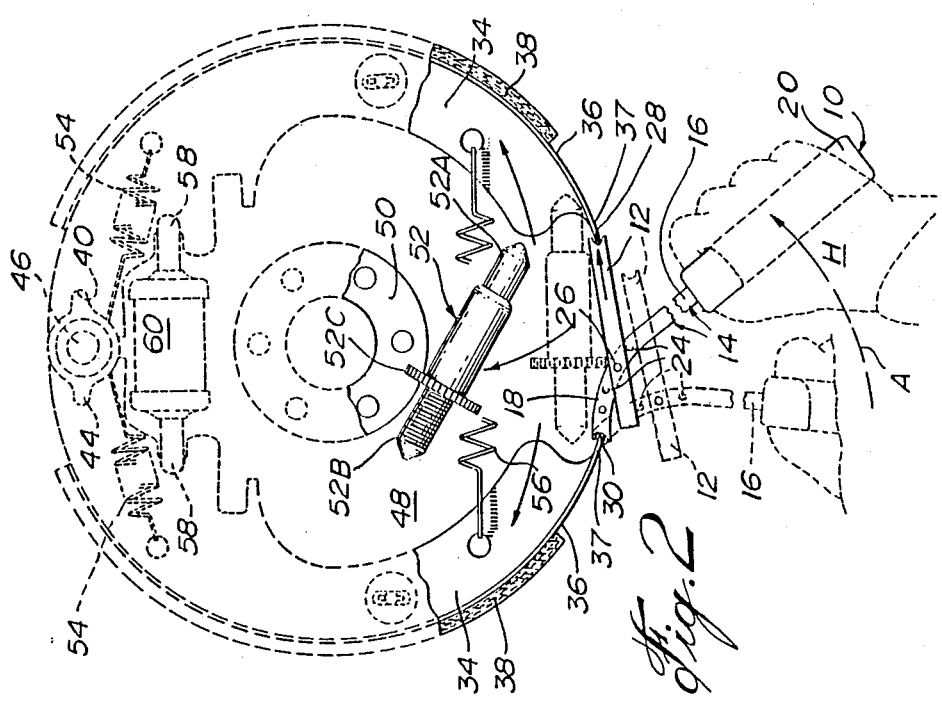
FIG. 2 is the view of FIG. 1 but with the brake shoes being sufficiently spaced apart by the levered tool to release the spacer member from the pair of brake shoes.

There is disclosed a levered tool 10 comprising a rigid straight bar 12 and a rigid arm 14 having a hand-gripping straight portion 16 and an arcuate end portion 18. Portion 16 is advantageously provided with an enlarged handle 20 for facilitating its handling. A transverse bore 22 is provided about an intermediate portion of bar 12; and at least one, and preferably a few longitudinally-spaced bores 24, are provided about the arcuate portion 18, whereby a pivot member 26, such as a bolt and nut, is releasably engaged through bore 22 and a selected one of bores 24 for pivotal action thereabout. One end of bar 12 and the free end of arcuate portion 18 are also notched at 28, 30 respectively. Bar 12 is free to pivot 340° about pivot 26 relative to arm 14. The overall length of arm 14 is about 10 inches and the length of bar 12 about one-quarter that of arm 14. Tool 10 is used to spread apart two spring-interconnected conventional semi-circular concentric brake shoes 32, of T-shaped cross-section with a radial web 34 and an outer partly-cylindrical plate 36 to which adheres a brake lining 38. Web 34 has concave outer and inner ends 40, 42. The inner ends 42 terminate short of ends 37 of plates 36. Concave outer ends 40 releasably fit ears 44 of a stud 46 fixed to a support disk fixed at 50 to the wheel axle housing (not shown). Concave inner ends 42 releasably fit the ends of conventional, adjustable spacer member 52, normally made of two threaded parts 52A, 52B screwed one within the other, so that the overall length of spacer 52 can be manually or automatically adjusted through mechanism (not shown) engaging notched flange 52C of outer part 52A.

Figure 1:
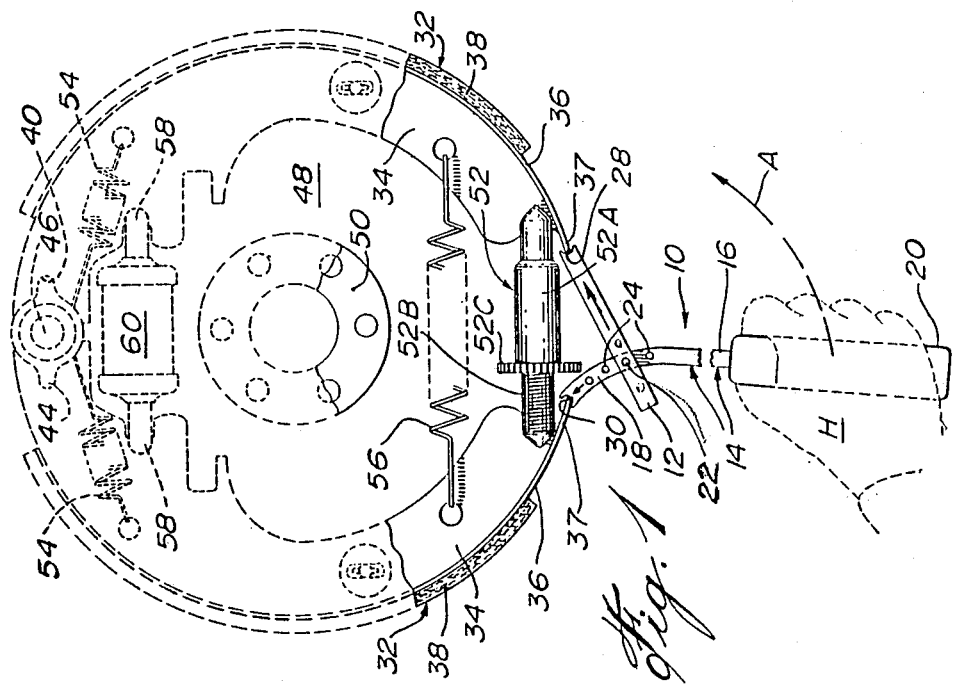
FIG. 1 is a side elevation of a pair of interconnected brake drum shoes, shown partly in phantom lines, and of the levered tool of the invention in position for gradually opening the interconnected brake shoes.

Heavy-duty tension coil springs 54 interconnect stud 46 with the outer ends of webs 34 to bias the outer concave ends 40 into engagement with stud ears 44. A heavy-duty tension coil spring 56, attached to the inner ends of webs 34, biases the concave inner ends 42 into engagement with the ends of spacer member 52. This is the brake drum releasing position of the brake shoes 32. The two plungers 58 of a hydraulic actuator 60, carried by disk 48, engage the brake shoes 32 to spread them apart to braking position against the bias of springs 54, 56. With brake lining wear, the length of spacer member 52 must be adjusted from time to time. This spacer member 52 must be removed if corroded. Tool 10 facilitates such removal and also its repositioning. Notches 28 and 30 of bar 12 and arm 14 respectively are fitted to inner ends 37 of brake plates 36, as shown in FIG. 1, and handle 20 pushed by hand H towards the brake shoes 32, as indicated by arrow A. Bar 12 and arm 14 act as a toggle lever system and easily spread apart the two brake shoes 32, whereby spacer member 52 can be easily removed. The same operation is effected to reposition the same or another spacer member. One selects the bore 24 to receive pivot member 26, depending on the size of the brake system.

What I claim is:

1. A handtool for spreading apart two spring-interconnected brake drum shoes to facilitate removal of an adjustable spacer member having opposite ends engaging adjacent parts of said brake shoes, the latter having free end edges facing each other adjacent said spacer member, said tool comprising a rigid, straight bar having a first notched free end and a rigid arm having a hand-gripping straight portion and an arcuate end portion terminated by a second notched free end, said arcuate portion and said bar pivotally interconnected about a pivot member which is spaced from said first and second notched free ends, the latter adapted to receive said respective free edges of said brake shoes, whereby pivotal movement of said arm about the free edge received by said second notched free end towards the brake shoe, the free edge of which is received by said first free edge, will spread apart said two free edges.

2. A handtool as claimed in claim 1, further including means to vary the distance of said pivot member from one or the other of said first and second notched free edges.

* * * * *